THREE DIMENSIONAL CAM

Filed Aug. 22, 1961

INVENTOR
MARVIN WEISS
BY Borst & Borst
ATTORNEYS

United States Patent Office 3,160,744

Patented Dec. 8, 1964

3,160,744
THREE DIMENSIONAL CAM

Marvin Weiss, Pearl River, N.Y., assignor to Sperry Rand Corporation, Ford Instrument Company Division, Long Island City, N.Y., a corporation of Delaware Filed Aug. 22, 1961, Ser. No. 133,129
2 Claims. (Cl. 235—197)

Figures 1, 2, 3, 4:
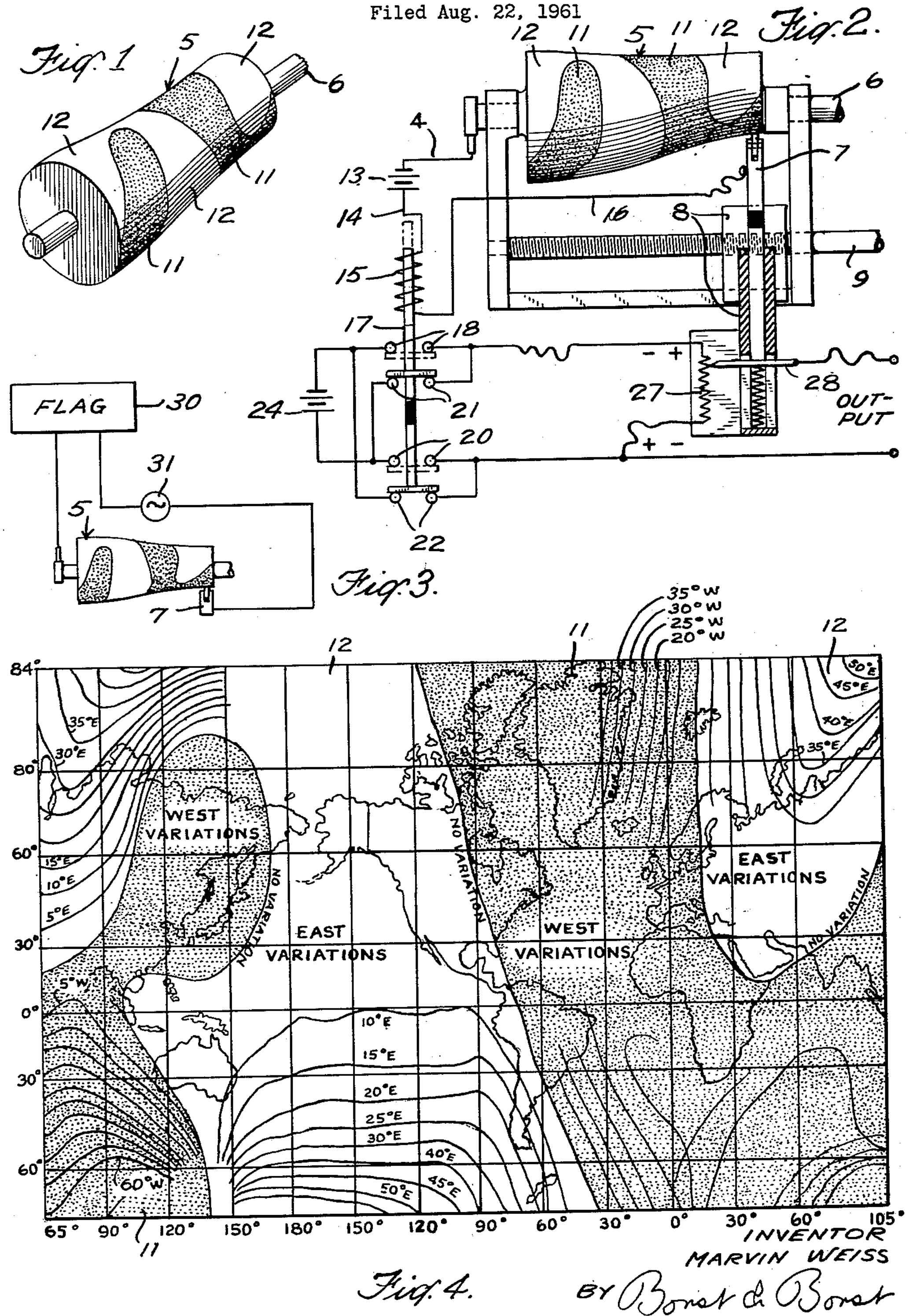

This invention relates to mechanical computing devices and particularly the type which is known as a three-dimensional cam.

Three-dimensional cams normally give a value of one dependent variable as a function of two independent variables. For example, it provides the value of magnetic variation as a function of latitude and longitude. Displacement of the cam follower must yield not only an angular value for the variation but must indicate whether the variation is east or west. In order to accommodate this much information on the surface of the cam, the cam must be formed so that the radial distance of surface points from its axial center varies continuously from 180° east variation to 180° west variation. This means that for cams of conventional and particularly of miniaturized sizes the transition from 180° east to 180° west is necessarily abrupt. Since it is mechanically impossible for the cam follower to follow abrupt change in radial direction in the cam surface, the cam surface must be smoothed in this area thus introducing large errors.

According to this invention, the requirement for smoothing cam surfaces in the area of accelerated change is eliminated. To this end, the three-dimensional cam is so formed as to accommodate an additional dependent variable on its surface which is independent of radial surface change. This second dependent variable is discontinuous and would have, for example, only two values. This expedient permits one dependent variable to change in a continuous and gradual manner thus permitting a corresponding change in the cam surface over its entire area. If the cam is formed to yield magnetic variation, for example, the cam lift would then represent only the magnitude of the variation and not the direction east or west. This magnitude would change in a gradual manner on passing from east to west variation and vice versa. The additional dependent variable would then indicate east or west. According to the invention, this additional variable is introduced in the cam by insulating certain areas of its surface when, for example, the variation is west and permitting the remaining areas to be conductive where the variation is east. A circuit utilizing the presence or absence of conductivity between the cam follower and the cam surface could thus be used to indicate the direction of variation.

One object of the invention is to provide a new and improved three-dimensional cam.

Another object of the invention is to provide a computer utilizing a three-dimensional cam and adapted to yield accurately over the entire surface of the cam the values of two dependent variables.

Other objects and advantages of the invention may be appreciated on reading the following description of one embodiment thereof which is taken in conjunction with the accompanying drawing, in which FIG. 1 is a perspective of the improved three-dimensional cam, FIG. 2 is a computer circuit in which the improved cam is employed, FIG. 3 is a modified circuit including the cam as a component, and FIG. 4 is a representation of a geodetic map indicating magnetic variation.

There is illustrated in Fig. 1 a three-dimensional cam 5 which is approximately cylindrical in shape and having two inputs, latitude and longitude, and one output, magnetic variation. The longitude input is represented by the angle of rotation about the cylinder axis 6 and the latitude input is represented by the axial position of the spring biased cam follower 7 slidably carried in the carrier 8 which is mounted for axial translation on the feed screw 9. The output is generated according to the radial lift of the cam follower. The region of the cam surface 11 representing west variation is covered with a material to form an insulating layer, such as by anodization thereof, the remainder of the cam surface 12 representing east variation being conductive. The map shown in FIG. 4 indicates magnetic variation with geodetic lines, shaded areas being west variation and the non-shaded areas east variation. The heavy lines borders between east and west variation define points of no variation or of 180° variation east and west. The insulated and conductive regions on the surface of the cam correspond to the shaded and non-shaded areas, respectively, of the map.

The conductive surface of the cam 5 is connected by lead 4 to one terminal of battery 13, the other terminal of the battery being connected to solenoid coil 15 by means of conductor 14. The other side of the coil is connected to the cam follower 7 by means of conductor 16. The coil 15 controls the position of armature 17 which is adapted to engage pairs of contacts 18 and 20 in its upper position and pairs of contacts 21 and 22 in the lower position. On armature engagement therewith terminal contacts 18 and 22 are connected to the negative side of battery 24 and terminal contacts 21 and 20 to the positive side of the battery. Potentiometer 27 is connected across the polarity reversing terminals 18, 20 and 21 and 22 and is borne by the carrier 8. It is provided with a wiper arm 28 secured to the cam follower 7 being driven thereby in accordance with the displacement of the follower as a consequence of its contact with the surface of the cam 5.

In operation, it is seen that an additional dependent variable represented by the electrical conductivity of the surface of cam 5 is introduced into the output of the potentiometer 27 by controlling the polarity of its output. Polarity control of the potentiometer is achieved by means of a relay circuit which includes the cam and a solenoid switch connected across a battery and capable of reversing its excitation. In this instance this additional dependent variable represents direction of magnetic variation. The magnitude of the variation is represented in the normal manner by the position of the wiper with respect to the potentiometer winding as controlled by the lift or rise of the cam follower 7. It is, accordingly, seen that the dependent variable output in the circuit is a function of the continuous variable determined by the radial position of the cam follower and the discontinuous variable determined by the condition of a relay circuit in which the three-dimensional cam is a component. Since the latter variable is independent of radial distance of the cam surface, the surface may be formed to yield values for the former without the necessity of smoothing abrupt surface transitions which are productive of output error.

The schematic circuit shown in FIG. 3 includes a flag 30, the cam 5 having conductive and non-conductive regions representing areas of east and west magnetic variation, respectively, a cam follower 7 and generator 31. The position of the flag serves to indicate the direction of magnetic variation depending on the conductive state of the circuit. The radial position of the follower would be representative of magnetic variation in terms of magnitude as explained above.

Various other embodiments of the invention will be effected by persons skilled in the art without departing from the scope and principle of the invention as defined in the appended claims.

What is claimed is:

1. A computer circuit comprising a three-dimensional cam, an electrical device mechanically driven according to the output of said three-dimensional cam, said cam having a surface partially conductive and partially non-conductive, a voltage source connected to said electrical device, means connected to said three-dimensional cam and disposed between said voltage source and said electrical device for reversing the excitation of said device according to whether the conductive or the non-conductive portion of the cam surface is electrically connected to said source.

2. A computer circuit comprising a three-dimensional cam and cam follower, an electrical device mechanically driven by said cam follower according to the magnitude of the output of said three-dimensional cam and the conductivity of its surface, said cam having a surface partially conductive and partially non-conductive, a polarity reversing relay having an operating coil, a voltage source connected to said electrical device through said polarity reversing relay, a second source connected to said relay coil and to said cam follower, said relay coil being also connected directly to the conductive surface portion of said cam.

References Cited by the Examiner

UNITED STATES PATENTS

| | | | |
|---|---|---|---|
| 2,114,330 | 4/38 | Borden ---------- | 235—197 XR |
| 2,952,847 | 9/60 | Steber -------------- | 343—7.9 |

OTHER REFERENCES

"Generator for Functions of Two Variables," by George R. Welti, Sept. 9–11, 1953; page 1 relied on.

MALCOLM A. MORRISON, *Primary Examiner.*

WALTER W. BURNS, Jr., *Examiner.*